(Model.)

J. I. EAVENSON.
KNOTTER FOR HARVESTER BINDERS.

No. 306,232. Patented Oct. 7, 1884.

Witnesses:
J. W. Garner
E. M. Kroger.

Inventor:
Jas. I. Eavenson,
per
J. A. Lehmann, Atty.

N. PETERS, Photo-Lithographer, Washington, D. C.

UNITED STATES PATENT OFFICE.

JAMES I. EAVENSON, OF WEST CHESTER, PENNSYLVANIA.

KNOTTER FOR HARVESTER-BINDERS.

SPECIFICATION forming part of Letters Patent No. 306,232, dated October 7, 1884.

Application filed August 24, 1883. (Model.)

*To all whom it may concern:*

Be it known that I, JAMES INGRAM EAVENSON, of West Chester, in the county of Chester and State of Pennsylvania, have invented certain new and useful Improvements in Knotters for Harvester-Binders; and I do hereby declare the following to be a full, clear, and exact description of the invention, such as will enable others skilled in the art to which it pertains to make and use it, reference being had to the accompanying drawings, which form part of this specification.

My invention relates to an improvement in knotters for harvester-binders; and it consists in the combination of the knotter provided with two prongs, which are preferably of the same length, and which have the inner corners of their outer ends beveled away, so as to allow the cord to slip freely off between the prongs of the knotter, with a tongue provided with a hook at its outer end, the hook being either stationary or pivoted, as may be preferred, all of which will be more fully described hereinafter.

The object of my invention is to dispense with the usual projections upon the rear end of the tongue and all of the springs and regulating appliances heretofore used, and thus make the knotter entirely automatic in its action.

Figure 1:
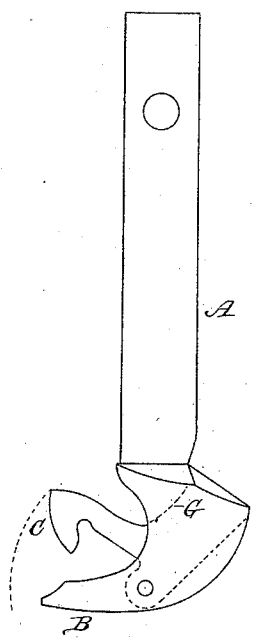
Figure 2:
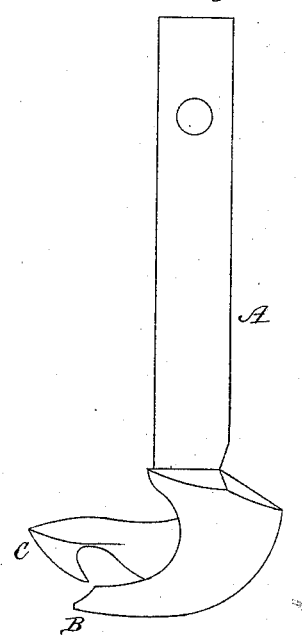
Figure 3:
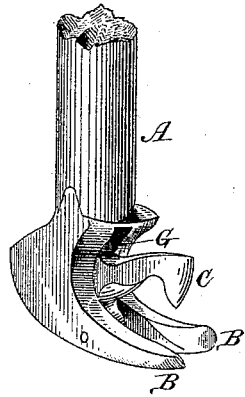

Figures 1 and 2 represent side elevations of knotters, which only differ from each other in that the tongue in one case is pivoted and in the other stationary. Fig. 3 is a perspective of the knotter complete.

A represents the knotter, which is constructed in the usual manner, with the exception that the lower end of the knotter is divided into two prongs, B B, which are separated a suitable distance from each other. The inner corners of the outer ends of these prongs are beveled away, as shown, so as to allow a sufficient space between these ends and the hook on the tongue C for the cord to slip freely off between the prongs of the knotter without catching and breaking the cord after the knot is formed. Either pivoted between the prongs or secured permanently in place is the hooked tongue C, which will have its outer end to extend any suitable distance outward, and have its end so shaped as to serve as a guide in conducting the twine into position ready to have the knot tied. When the tongue is made stationary, its lower point or hook is made to project downward and about on a line with the top of the prongs. When the tongue is pivoted in position, when it closes down its point or hook will project down in between the prongs, as shown. When the tongue is pivoted in position, it has a shoulder or offset, G, extending upward, and this shoulder is in such relation to the pivot that when the cord is brought over the top of the tongue by the needle, the pressure of the cord against the shoulder, either when the cord first catches over the top of the tongue or when the knotter is made to revolve, causes the tongue to rise out of the way, so that the cord can catch over the tops of both of the prongs before the hook has finished its revolution. The pressure of the cord upon the top of the tongue then causes it to instantly close downward and to hold the cord when the stripper is pushing the loop off until the knot is formed. The stripper pushes off the cord at the same time that it is cut. Where the tongue is not pivoted, the beveled end of the tongue serves as a guide as the hook comes around, and performs the operation of tying the knot just as well as though it were pivoted. Whether this tongue shall be secured rigidly in place or be pivoted, as above described, is a mere matter of choice. In either case the lower point of the hook comes down in between the beveled ends of the prongs, or just above them, and these beveled ends, in connection with the beveled sides of the hook, serve to allow the cord to slip off freely from between them without the slightest danger of holding or breaking the cord. The prongs of the knotter need not necessarily be of the same length, as one may be shorter than the other; nor is it necessary that the slot or recess between the two prongs should extend much farther back than the hook on the tongue. These constructions are a mere matter of choice.

Having thus described my invention, I claim—

The combination, in a knotter, of the two prongs separated from each other by a recess or slot, and the tongue provided with a hook placed above and between the prongs, said prongs having the inner corners of their outer
5 edges beveled away to allow the cord to slip freely off between the prongs and the tongue, substantially as specified.

In testimony whereof I affix my signature in presence of two witnesses.

JAMES I. EAVENSON.

Witnesses:
F. A. LEHMANN,
E. D. YORK.